Patented Oct. 23, 1934

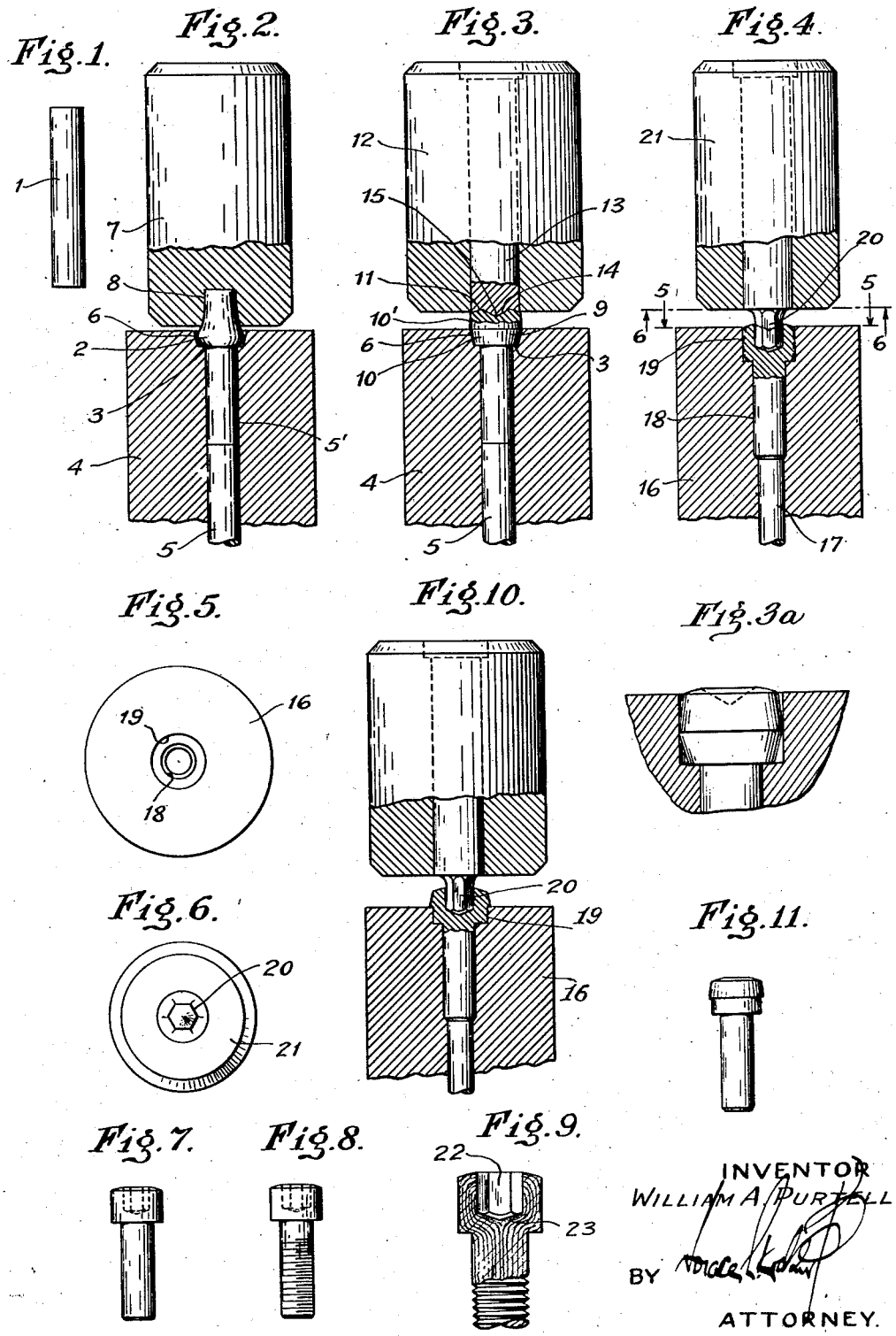

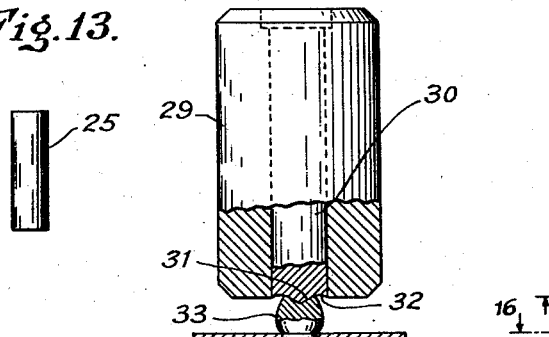
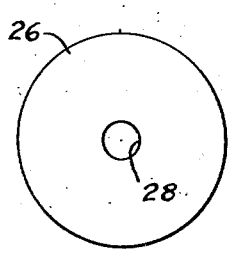
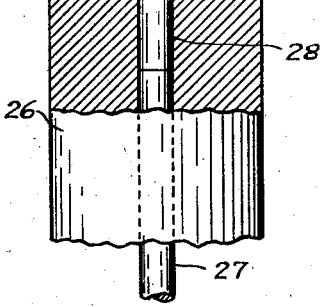
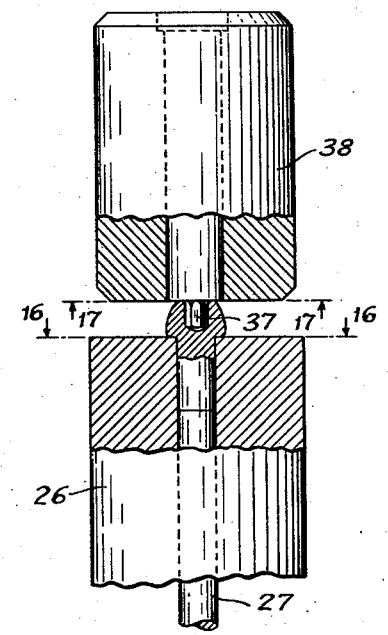
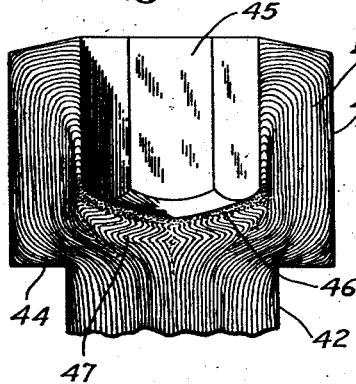
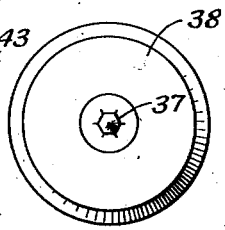
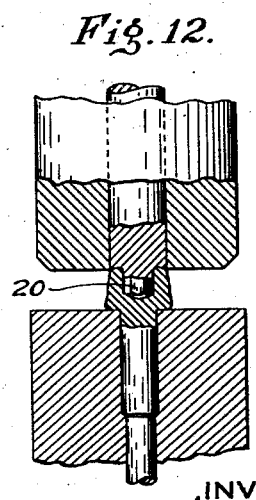

1,978,371

UNITED STATES PATENT OFFICE 1,978,371

COLD FORMED SOCKETED OR HOLLOW SCREW AND METHOD OF AND APPARATUS FOR MAKING THE SAME

William A. Purtell, Hartford, Conn., assignor to The Holo-Krome Screw Corporation, a corporation of Connecticut Application June 4, 1931, Serial No. 542,077

80 Claims. (Cl. 10—10)

My invention relates to cold formed socketed or hollow screws and methods of and apparatus for making the same.

On account of the character of the steel required, of high carbon and usually also in the form of nickel, chrome or other like alloys, it has heretofore been the best practice in making hollow fillister or cap screws to use cold round stock of relatively large diameter, turn the same down in a screw machine to form a head while threading the shank, and, thereafter, drill a round hole in the head, and then force the headed blank through an aperture in a die with a hexagonal punch in such manner as to draw the diameter of the head to the desired diameter and cause the metal of the head to be so shaped around the hexagonal punch as to produce the desired hexagonal opening in the head. Thereafter, the blank has been further turned in a trimming machine to finish the head.

In some cases, the cold blank, instead of being turned down in the screw machine to form the head, has been provided with a head in a common header or in a rivet forming machine or an upsetting machine, but thereafter the head has been drilled axially to provide the round hole therein as previously described. In some cases, also, after the formation of this hole, the hole has been broached to produce the desired hexagonal or other wrench receiving aperture and the broached blank then finished, as previously described, and then threaded.

The fillister or cap screws produced by the above methods, which employ drilling or boring out of an axial aperture in the head thereof, have an area of inherent weakness between the periphery of the bottom of the hexagonal aperture therein and the inner periphery of the bottom of the head. This is due to the fact that there is inherently little difference in the diameter of the shank and of the axial aperture, and to the further fact that the boring out of the axial aperture in the head, cutting off and removing the metal, leaves only a small number of fibres of the metal extending in continuous form from the shank into the head. This weakness is especially marked in screws wherein the head on the blank is formed by turning the stock down in a screw machine or the blank after being drawn or broached is finished in a trimming machine, since the turning operations also cut off certain of the exterior fibres.

My invention has among its objects to provide an improved socketed screw, and, more particularly, an improved socketed fillister screw of a standard shape having substantially increased strength in the portion of the same heretofore considered to be the inherently weak portion of such a screw, and a large number of continuous fibres extending from the shank between the bottom of the head and the bottom of the hexagonal aperture, while also having the metal of the head so worked as to be solidified and strengthened and an accurate hexagonal socket formed therein. A further object of my invention is to provide an improved method of making such socketed screws, and more particularly socketed fillister screws, whereby it is made possible to reduce substantially the manufacturing cost of such screws made by previously known methods while eliminating the necessity for initial turning down of the stock, boring of the blanks, drawing or broaching of the same, and also final finishing of the same in a trimming machine. A still further object of my invention is to provide improved apparatus whereby my improved screws above described may be made in accordance with my improved method likewise referred to. These and other objects and advantages of my invention will, however, hereinafter more fully appear.

In the accompanying drawings, I have shown for purposes of illustration, several embodiments which my invention may assume in practice.

In these drawings,—

Figure 1 is a side elevation of a blank of uniform diameter as used by me;

Fig. 2 is a side elevation partially in section, showing the first step in the upsetting process;

Fig. 3 is a similar view showing the second step in the upsetting process carried on simultaneously with an initial punching step;

Fig. 3a is an enlarged detail of the blank in the socketing die prior to socketing, the die being shown in section and the blank in side elevation;

Fig. 4 is a side elevation partially in section, showing the step of forming the hexagonal socket;

Fig. 5 is a view looking down into the die of Fig. 4;

Fig. 6 is a view looking up at the hexagonal punch of Fig. 4;

Fig. 7 is a view of the blank after the completion of the step shown in Fig. 4;

Fig. 8 is a similar view of the completed screw after the threading operation;

Fig. 9 is an enlarged sectional view of the upper end of the blank shown in Fig. 8 showing the disposition of the fibres in the head;

Fig. 10 is a view corresponding to Fig. 4, but showing a modification wherein the lower end of the head is in the lower die while the upper end of the head projects out of the latter during the formation of the hexagonal aperture;

Fig. 11 shows a blank after the completion of the step shown in Fig. 10;

Fig. 12 is a view similar to Fig. 4 but showing a further modification wherein the blank head is wholly outside the lower die during the formation of the hexagonal aperture;

Fig. 13 shows a modified form of blank used in making set screws;

Fig. 14 shows the combined upsetting and punching operation which forms the first step in making set screws;

Fig. 15 is a view similar to Fig. 12 but showing the hexagonal punch operating on the set screw blank shown in Fig. 14;

Fig. 16 is a plan view of the lower die shown in Fig. 15;

Fig. 17 is a plan view of the hexagonal punch shown in Fig. 15;

Fig. 18 shows the set screw blank after being finished;

Fig. 19 shows the completed set screw after threading, and

Fig. 20 is an enlarged view of the upper end of a screw shown in Figure 9, showing the fibres schematically arranged as disclosed by an enlarged photograph.

In describing the manufacture of my improved screw in accordance with my improved method and utilizing my improved apparatus, reference will first be made to Figures 1 to 8 of the drawings showing certain of the steps in the process of making the screw in accordance with the preferred form of the invention and as applied to fillister or cap screws.

In this form of my invention, a blank 1 of suitable length and of uniform cylindrical cross section and of the desired high carbon alloy steel such as above referred to, is first cut off from the wire. This blank, while cold, is next upset to form a head thereon. This upsetting is preferably obtained in a plurality of upsetting operations, herein, as preferably, two, which bring the blank 1 successively into the forms illustrated in Figures 2 and 3. More particularly considering the upsetting operations, it will be noted that the blank 1 is first partially upset, as shown in Figure 2, in such manner as to provide an upset portion 2 intermediate its ends and also a slight land or flattened portion 3 on the lower end of the portion 2, and that it is next, as shown in Figure 3, further upset to press its upper end down to form the portion 2 into a head blank while maintaining the land 3.

In the apparatus illustrated in Figure 2, it will be noted that the blank 1 is inserted in a lower die 4, above a usual knock-out pin 5 with its shank in an axial aperture of the same diameter as the aperture 5' for the pin 5, and forming a continuation of that aperture. In this position, the upper end of the blank projects through a wider and more shallow die cavity or aperture 6 formed in the upper face of the die 4 and having slightly tapered sides and a flat axial bottom surface adapted to produce the land 3. It will also be noted that the aperture 6 is substantially larger than the un-upset blank, and also preferably of such size as still to be slightly larger than the blank even after the initial upsetting operation. Cooperating with this die 4 is an upper movable upsetting die 7 having an elongated aperture 8 adapted to receive the upwardly projecting end of the blank before and during upsetting, and herein also having a slightly enlarged lower end. Thus, when the die 7 is brought down upon the die 4, a relatively wide bottomed upset portion 2 and small land 3 will be formed thereon spaced below the smaller upper extremity of the blank in the aperture 8, but it will be noted that the portion 2 will not completely fill the aperture 6 in the die 4.

After the blank has been shaped as described, it is next further upset while cold into the form shown in Figure 3, i. e. in such manner as to cause the lower end of the blank shown in Figure 2 to fill the aperture 6 in the lower die and the whole upper end of the blank to assume the head shape shown in Figure 3, wherein its upwardly projecting end is forced down, and the intermediate portion 2 formed into a head 9 having not only the land 3, but a relieved or tapered portion 10 at the bottom around and above the land 3, a very slightly tapered and reversely tapered upper portion 10', and a rounded or crowned top 11. While, if desired, a plurality of additional upsetting operations utilizing a plurality of different dies may be provided to bring about this change in shape, I preferably use but one additional upsetting operation and one additional die 12, as shown in Figure 3, and operate upon the blank while it is still in the aperture 6 in the die 4. In the apparatus shown in Figure 3, it will also be noted that the movable die 12 is, as preferably, of the type having a replaceable member 13, while the latter herein also is provided with a working face so concaved about its periphery as to produce the crown 11 referred to above.

While under certain conditions the blank may have the hexagonal socket formed therein without a preliminary punching or may be subjected to a separate preliminary punching operation after the head 9 has otherwise been formed as shown in Figure 3, I preferably so preliminarily punch it and also do this with a minimum of expense in the preferred embodiment of my invention, by forming an initial shallow depression or punched aperture 14 in the upper crown surface 11 of the blank at the same time that the last step in the upsetting operation is being performed. Herein, as in a preferred construction, it will be noted that the aperture 14 is conical in form and axially disposed, and produced by providing a corresponding conical extension 15 on the member 13 disposed coaxially with and within the peripheral working surface forming the rounded end 11 on the blank, but extending downward slightly beyond the lowermost part of that surface.

Thus it will be noted that a blank is produced expeditiously and cheaply in only the two upsetting operations described, which has its fibres initially deflected laterally in such manner as to facilitate further lateral deflection of the fibres during socketing, and has its head 9 so formed as to provide a land 3 on its bottom and further has a relieved or tapered lower portion 10 extending downwardly and inwardly to the outer periphery of the land and a reversely disposed and slightly less relieved or tapered upper portion 10', while the head also has a crowned or rounded top around the periphery of an axial initial punching 14. More particularly, a blank is provided having both the bottom and the top of the head partially formed as regards the land 3 and crown 11, respectively, and also a relieved or tapered portion to be socketed including the tapered portion 10 which extends below the bottom of the socket to be formed in the blank, and herein also the top tapered portion 10', the function of both of which will hereinafter more fully appear in connection with the description of the punching or hexagonal socketing operation.

In my improved process, when using steel of the usual high carbon alloy types referred to above, the blank is also annealed before the hexagonal opening is inserted therein. This annealing process may come after the step illustrated in Figure 2 and before the initial punch aperture 14 is inserted in the blank, but preferably I anneal the blank after the operation illustrated in Figure 3. The purpose of annealing is to normalize the fibres of the steel and soften the same, all in such manner as to enable the insertion of the hexagonal aperture in the cold head as hereinafter described, without breakage, and while obtaining the desired flow of metal, and producing an improved product, as likewise hereinafter described.

The next step after annealing in this preferred embodiment of my invention includes the insertion of the hexagonal aperture in the cold blank and the simultaneous formation from the blank of the remainder of the finished head, as a result of the filling out of the lower relieved portion 10 of the blank laterally above and beyond the land and the simultaneous socketing and shaping of the side of the head during the formation of the hexagonal aperture, all while the displaced metal in the head is free to flow with lateral components in its flow to fill out the die in which the socketing operation is performed.

In the apparatus shown in Figure 4, I use during this socketing operation a stationary die 16. This, herein, has not only a knock-out pin 17 in its bottom, which forms a support for the lower end of the blank, but also a co-operating elongated axial aperture 18 which is adapted to receive and form the lower round end of the shank of the blank and herein is of slightly larger diameter than and above the pin and connected with the aperture in which the pin moves by a conical seat. As shown, the die 16 also has an open die cavity or aperture 19 in its upper surface adapted to receive the head of the blank and of greater diameter than the aperture 18 and surrounding the upper end of the latter. This aperture 19 is herein of uniform cross section and cylindrical form with square or right angled corners where its side wall joins its bottom, and where the latter joins the aperture 18. This aperture 19 is also slightly wider than the widest portion of the head 9 in such manner as to permit the latter to be readily forced down therein, and also is preferably a trifle deeper than the head 9 of the blank, all in such manner that the metal in the head will fill out the aperture 19 and produce a finished head therein when a slightly relieved hexagonal punch 20, preferably having a blunt conical or rounded end and forming part of a movable die member 21, is forced down into the position shown in Figure 4, wherein the lower end of the punch 20 is spaced above the land 3. Here, of course, it will also be understood that usual air vents (not shown) are provided in the die aperture 19.

More particularly, it will be noted that when the punch 20 is thus forced down into the cold head of a blank located in the aperture 19, the metal in the head will not only be forced downward in advance of the punch, but will also flow freely with a lateral component in its flow in such manner as, during the initial downward movement of the punch, to cause the upper tapered portion 10' of the head of the blank to fill out slightly laterally in such manner as to engage and fill the upper part of the die 16, and, thereafter continue to flow freely to fill out the relieved lower portion 10 of the blank laterally above and at the outside of the partially formed land and, upon engagement with the lower outer portion of the aperture 19, complete the formation of the bottom portion of the finished head as the punch 20 completes the formation of the socket. Further, it will be noted that the blank will still retain the rounded or crown form of the top of the same and only so minutely elongate its head as to be inappreciable and eliminate any problems arising from extrusion. At the same time, of course, the hexagonal punch will also reproduce itself accurately in the top of the head in such manner as to produce a hexagonal opening of accurate form.

Referring to Figure 7 which shows the blank upon its removal from the die 16 after the operation shown in Figure 4, it will be noted that the blank is then complete save for threading, with straight vertical sides, square lower outer edges, a rounded top, and a clean cut bottom on the head where it joins the shank. Thus, all necessity for the usual finishing operations is eliminated, and all that remains to be done to the blank is to thread the shank of the same to make it assume the form of the finished product illustrated in Figure 8.

Attention is here also directed to Figure 9 which shows schematically on a small scale the internal fibre arrangement in the completed screw as revealed by etching. Here it will be noted that as a result of my improved method of making the screw, instead of boring out an axial aperture in the head and drawing or broaching the same, I am enabled to do away altogether with the cutting off of the fibres in the head and substantially strengthen the head at what was previously its weakest point. More particularly, it will be noted that as the metal is forced downward by the punch to form the hexagonal aperture 22, the fibres of the blank, which ordinarily extend straight through the latter, are caused to be forced ahead of the punch while also being diverted laterally outwardly by the punch into the sides of the socket and around the bottom of the latter where the shank joins the head in such manner as to extend up along the head and around the socket to the top thereof. Moreover, it will be noted that they extend around a compressed or solidified area 23 at the bottom of the hexagonal aperture 22, formed by the compacting of certain of the axial fibres, and that certain of the diverted fibres also have their upper ends turned inward toward the aperture 22 and terminating in the side walls of the latter. No fibres being cut or bored out, and the number of the metal fibres at what was previously the zone of greatest weakness of the screw being substantially increased, at the same time that unbroken fibres are permitted to extend continuously around the socket and are reenforced by the compressed portion 23 at the bottom of the hexagonal aperture, a markedly strong and effective screw is produced wholly free from the weakness heretofore assumed to be inherent in this type of screw, and one also having an accurate socket, the walls of which are also substantially strengthened.

Here attention is also directed to Figure 20 wherein the fibrous structure is illustrated on a larger scale in an effort to reproduce in a drawing an enlarged photographic view of an etched section, the drawing, of course, being somewhat schematic, due to the inherent difficulties in reproducing the multitude of fibres in a drawing. Referring more particularly to this Fig. 20, it will be noted that the fibres 41 which extend upward from the shank 42 of the fillister screw illustrated, are unbroken and substantially unstretched and extend continuously into the head 43 between the bottom shoulder 44 on the head and a punched socket 45 which is complete and true, and herein of substantially uniform diameter substantially throughout its length and of hexagonal cross section. More particularly, it will be noted that these fibres are diverted laterally outwardly around the socket between the bottom of the socket 45 and shoulder 44 and are compressed or compacted so that a large number of such fibres pass through this relatively small area, and extend continuously from end to end of the screw while forming the side walls of the socket 45. Here it will also be understood that although some of these fibres may appear to be shorter and broken in Fig. 20, these are, in fact, of the same length as the others and also continuous, it being obviously impossible for all fibres to be so illustrated with a pen in view of the large number of fibres. It will also be noted that their upper ends are again deflected laterally, but in this case inwardly, so that they terminate in the vertical walls of the socket 45. Moreover, it will be noted that at the bottom of the socket 45, as shown in Fig. 20, a compressed or solidified area 46 is formed by compacting of certain of the axial fibres. As visible only from the enlargement shown in Fig. 20, it will also be noted that certain of these axial fibres are deflected laterally intermediate their ends in this area 46 below the bottom of the socket. These fibres, which are of course far more numerous than can be illustrated, each apparently has a deflected portion near its upper end. Further, the fibres on each side of the axis (Fig. 20) are deflected laterally to form a rather pointed portion extending in one direction, while those on the other side are similarly deflected laterally in the opposite direction. In the round article, all fibres are thus apparently radially deflected beneath the bottom of the socket to form what may be called an inner flanged core 47 of deflected core fibres having the enlarged flanged portion of this core spaced beneath the bottom of the socket 45. Some fibres in the smaller upper end of the axial core also apparently extend axially upward to form the socket bottom and the whole of the latter is believed to be formed by similar ends, though indistinguishable and therefore indicated by stippling. Attention is further directed to the fact that this deflected portion 47 is disposed above the compacted laterally deflected portions of the fibres 41 which extend laterally around the bottom of the socket as previously described and terminate in the vertical walls of the socket 45, all in such manner as in no way to interfere with the continuity of the latter fibres, while causing the same to be condensed as they pass between the bottom of the head and the socket bottom.

As a result of my improved construction it is made possible to produce, without appreciable extrusion, a fillister screw of the form shown in Figs. 9 and 20, which has a substantially unbreakable head, wherein the fibrous structure in the head is of the same character and at least as strong as that in the shank, and wherein, due to the improved continuous and unstretched fibres as well as the compacted fibres, as distinguished from the extruded fibres of the prior art, markedly increased strength is obtained not only at the junction of the head with the shank and between the bottom of the head and the bottom of the punched socket, but also markedly increased strength in the socket walls. Thus, due to this greater strength and the perfect or complete hexagonal character of the socket obtainable, the socket will retain its shape under substantially all conditions.

In carrying out my invention, I may also, if desired, modify the steps and apparatus used to insert the hexagonal aperture after making the blank heretofore described and shown in Figure 3. One such modification is illustrated in Figure 10 wherein I utilize a lower die generally similar to that in Figure 4, but in which, while using a blank of the same shape as heretofore, and similarly smaller than the die aperture, I have only the bottom of the blank seated in the aperture of the lower die, and the upper part, herein substantially the upper half, of the blank projecting out of the top of the lower die during the hexagonal punching operation. When, in this construction, the punch 20 is forced down into the initial aperture 14 in the blank, it is found that substantially the same metal flows occur as previously described, particularly as regards the lower end of the head, while the upper end of the head, though slightly widened on an angle, as indicated, also retains substantially its original conformation. Some finishing of the upper part of the head is required to shape up the product shown in Figure 11 where a finished form corresponding to Figure 7 is desired. In Figure 12 I have also illustrated a further modification which, like that shown in Figure 10, while not preferred, may be used under certain conditions. In this construction, as distinguished from being wholly inside the die during socketing (Fig. 4), or part in and part out of the die (Fig. 10), as heretofore described, the head of the blank is wholly outside the die during the insertion of the hexagonal punch. Obviously, substantially the same results will be obtained in this construction, save that additional lateral finishing will be required to remove the excess laterally extending metal and shape up the head if a finished product is desired of the form shown in Figure 7. Here, it will also be noted that, although unnecessary to prevent extrusion for reasons noted in connection with previous forms of my invention herein described, I may also use a shoulder surrounding the upper end of the punch 20 as a nut punch to function with the surface of the die in reducing subsequent finishing required on the top and bottom of the head. In the use of both of these modifications shown in Figures 10 and 12, neither of which constitutes a preferred form, it will be understood that the blank is annealed prior to the insertion of the hexagonal punch as hereinabove described in connection with the first and preferred form of my invention.

My improvements are also capable of being used in making hollow set screws and result in improved set screws generally similar to my improved fillister screws. Here reference is made to Figures 13 to 19. As shown in Figure 13, a cylindrical blank 25, generally similar to my cylindrical blank 1 is used, but shorter than the blank 1. This blank is preferably, as heretofore, disposed in a stationary lower die 26 having a knock-out pin 27 and an aperture 28 above the latter, with the lower end of the blank 25 seated in the aperture 28 and the upper end projecting above the upper surface of the die. This upper end is then acted upon by a movable die 29, herein having a replaceable punch 30 and a conical punch point 31 on its inner end surrounded by a concaved surface 32. When the punch 30 is brought down upon the upper end of the blank, a blank 33 shown in Figure 14 and generally similar to that shown in Figure 3 will be produced in a single upsetting operation with curved sides somewhat larger in diameter than the blank used, and with an initial indentation or punching in its upper end. After this upsetting operation, the blank is also preferably then annealed, as heretofore described, prior to the insertion of the hexagonal aperture. The hexagonal aperture for set screws is also inserted in the blank while the top of the blank is outside the lower die and in the general manner described in connection with Figure 12. Thus, as shown in Figure 15, the blank is again placed in the upsetting die 26 and with the top of the blank wholly outside the die, a hexagonal punch 37, similar to the punch 20, and carried by a movable die 38 is brought down into the top as heretoofre described, but preferably slightly farther down and not quite to the bottom of the upset portion, as shown in Figure 15. As a result of the insertion of the hexagonal punch, the metal in the top will obviously flow in the same general manner as above described, but, as in Figure 12, without restraint save at the top and bottom of the upper end of the blank while the shaping at the top is here also used only to minimize the need for finishing. Obviously, however, the excess metal will have to be turned off after the hexagonal aperture has been formed, to produce a screw body of the uniform diameter characteristic of set screws and shown in Figure 18, and then the entire screw will have to be threaded as shown in Figure 19.

If desired, instead of two single stroke operations such as described, I may omit the step shown in Figure 14 and perform the operation of Figure 15 on the blank 25, i. e. form a set screw with the desired hexagonal aperture therein from the blank 25 in a single operation, it being noted that the blank being already outside the die, the metal is here also free to flow laterally as previously described during socketing. Obviously thereafter it will be necessary to trim off the surplus metal as heretofore described, and thread the screw.

As a result of my improvements, it will be noted that it is made possible to produce improved cold formed screws at a fraction of the cost of manufacture of the same when following previously known methods and using previously known apparatus. More particularly, as compared with the previous methods of forming the screws, it will be noted that the step of boring the heads is wholly eliminated, together with the objectionable results of the same, no cutting or removal of stock being required to produce the socket. Further, it will be noted that as compared with previous apparatus, all necessity for providing drilling machines, automatic screw machines, and trimming machines is eliminated, my improved fillister screw, save for threading, instead being formed in a series of simple upsetting and punching operations capable of being carried out with the use of simple and inexpensive dies, on standard, automatic, hopper fed machines. Moreover, it will be noted that in the preferred embodiment of my invention, there is not only no waste of material and no initial turning down of the stock required to form the head, but further no turning down of the head required to finish the screw, the same upon the completion of the insertion of the hexagonal aperture being finished save for threading, i. e. having the desired rounded top, the desired uniform diameter of head and shank, and also sharply squared where the head joins the shank. It will, of course, also be evident that the screws may be made much more expeditiously in all forms of my improvement, as compared with those made with the previous process requiring turning down to form the head, since in all forms of my improvement, no turning down is required, while my improved screws are also produced in the dies much more quickly than it is possible to produce screws which require the additional boring operation followed by a drawing operation or a broaching operation. Attention is also particularly directed to the improved quality and greater strength of the product, particularly the fillister screw, and to the improved character of the socket as regards accuracy, the socket being more accurately formed by the punch than is commercially possible when either drawing or broaching a round aperture into hexagonal form, while the punch also strengthens all of the walls of the aperture in an improved manner in the process of forming the same. Obviously, my invention can also be used to form polygonal apertures of various types and to form other articles than screws, as, for example, pipe plugs, wrench sockets, etc. These and other advantages of my improvements will, however, be clearly apparent to those skilled in the art.

In carrying out my improvements, it will be understood that while I have disclosed in the preferred embodiment of the same what I believe to be the most effective way of carrying out the same, I contemplate the use of portions to be socketed, herein in the form of either heads or blanks, which may vary somewhat in shape, and also as regards the form and extent of the relief provided on the portion to be socketed, while still permitting the desired metal flow during the insertion of the hexagonal socket. Also, I contemplate the possibility, under certain conditions, of using an additional or intermediate upsetting step between the steps illustrated in Figures 2 and 3, and also the possibility that if desired, the initial shallow punch aperture may be inserted as a separate operation between the completion of the upsetting operation of Figure 3 and the insertion of the hexagonal aperture of Figure 4. Further, it will be understood that in certain steels, not of the usual high carbon, nickel, or chromium types, I may omit the annealing operation, and that I further contemplate the possibility of annealing the blank under certain conditions before the initial punch aperture is inserted, although I prefer to anneal the blank after the latter operation. Also, although not preferred, it will be understood that I also contemplate the possible use of a punch of other shapes than hexagonal or polygonal under certain conditions, and also, if desired, the subsequent shaping of the socket or aperture into any suitable wrench receiving socket, as by another punching operation or by broaching, although these additional operations are not ordinarily desirable.

While I have in this application specifically described several forms which my invention may assume in practice, it will be understood that these embodiments are used for illustrative purposes, and that the invention is not limited thereto, but may be embodied in these and also various other modified forms without departing from its spirit or the scope of the appended claims.

What I claim as new and desire to secure by Letters Patent is:—

1. The step in punching a socket which consists in, forcing the displaced metal ahead of the punch in a blank end of larger cross section than the socketing part of the punch while maintaining any excess of said metal free for substantially free lateral flow away from the punch path as the punch engages and sockets the blank.

2. The step in punching a socket in the end of an unheated blank which consists in, forcing the unheated displaced metal ahead of the punch in a blank end of larger cross section than the punch while maintaining any excess of said unheated metal free for substantially free lateral flow away from the punch path as the punch engages and sockets the blank.

3. The step in punching socketed screws which consists in, forcing the displaced metal ahead of a punch while maintaining any excess of said metal free for substantially free lateral flow from beneath the punch as the punch engages and enters the blank and through increasingly greater distances laterally as the socket approaches its maximum depth to expand the portion of the article adjacent and below the bottom of the socket laterally through increasingly greater distances.

4. The step in punching a turning socket which consists in, punching a portion to be socketed of larger cross section at the point of punch entry than the maximum cross section of the socketing part of the punch while said portion is relieved to permit lateral flow of the displaced metal away from the punch path and while directing said metal, as the socket deepens, both laterally and ahead of the punch to fill out said portion to a point below the bottom of the useful part of the socket to a cross section at least equal to the original maximum cross section of said portion.

5. The step in punching a turning socket which consists in, punching a portion to be socketed of larger cross section at the point of punch entry than the maximum cross section of the socketing part of the punch while supporting said portion only at its inner end and maintaining the area of the outer end of said portion surrounding the socket free from inward pressure and while freeing the displaced metal for substantially free lateral flow away from the punch path throughout the punching operation and directing said free metal, as the socket deepens, both laterally and ahead of the punch to fill out said portion.

6. The method of forming socketed articles which consists in, forming a blank relieved to permit substantially free lateral flow of excess displaced metal throughout the socketing operation, and punching a socket therein while forcing the displaced metal ahead of the punch and maintaining any excess of said metal free for substantially free flow laterally away from the punch to fill out said blank laterally.

7. The method of forming socketed screws which consists in, forming a blank relieved externally to permit substantially free lateral flow of excess displaced metal throughout the socketing operation, and punching therein a socket of substantially uniform cross section substantially throughout the useful length of the socket while displaced metal is forced ahead of the punch and maintaining any excess of said metal free for substantially free flow laterally away from the punch path to expand the walls of said relieved blank laterally.

8. The method of forming socketed articles which consists in, forming a portion to be socketed adapted to permit lateral flow of displaced metal during socketing and of minimum diameter below the bottom of the useful part of the socket to be formed therein, and punching a socket in said portion while supporting the latter only at its bottom and forcing sufficient displaced metal to flow laterally to fill out said portion of minimum diameter.

9. The method of forming socketed screws which consists in, forming a blank externally relieved to permit substantially free lateral flow of excess displaced metal throughout the socketing operation, and punching a turning socket therein while forcing the displaced metal ahead of the punch and maintaining any excess metal free for substantially free lateral flow relative to the punch to progressively finish the socket and the exterior of the blank in the direction of punch movement as the socket deepens.

10. The method of forming socketed articles which consists in, forming an unheated blank relieved to permit substantially free lateral flow of excess displaced metal throughout the socketing operation, and cold punching a socket in said blank when unheated while the unheated displaced metal is forced ahead of the punch and any excess thereof is maintained free for substantially free flow laterally away from the punch to expand the walls of said relieved blank laterally.

11. The method of forming socketed screws which consists in, forming a blank relieved to permit substantially free lateral flow of excess displaced metal throughout the socketing operation, and cold punching a socket in said blank while the unheated displaced metal is forced ahead of the punch and any excess of said metal is forced laterally out of the punch path to finish the interior of the socket progressively in the direction of punch movement as the socket deepens.

12. The method of forming socketed articles which consists in, forming a tapered portion to be socketed which is so relieved as to permit substantially free lateral flow of excess displaced metal throughout the socketing operation and of minimum external diameter adjacent and below that part thereof which is to be the bottom of the socket, and punching a socket in said portion while forcing displaced metal ahead of the punch and freeing any excess of said metal for lateral flow to expand said tapered portion.

13. The method of forming socketed screws which consists in, forming a tapered portion to be socketed which is so relieved as to permit substantially free lateral flow of excess displaced metal throughout the socketing operation and of minimum external diameter below that part thereof which is to be the bottom of the socket, and punching in said portion a socket of substantially uniform cross section substantially throughout its length while forcing displaced metal ahead of the punch and any excess of said metal laterally to fill out said portion.

14. The method of forming socketed screws which consists in, forming a blank having a portion to be socketed relieved to permit substantially free flow of excess displaced metal throughout the socketing operation to fill out said portion laterally to substantially uniform external diameter below said turning socket, and punching a socket in said portion while disposed in a chamber of substantially uniform diameter and forcing the displaced metal ahead of the punch and any excess of said metal laterally from in front of said punch to fill out said portion as aforesaid in said chamber.

15. The method of forming socketed articles which consists in, forming a portion to be socketed relieved to permit substantially free flow of excess displaced metal throughout the socketing operation to fill out said portion laterally, and punching a socket in said portion while maintaining the area around the open end of the socket free from inward pressure throughout the socket forming operation and forcing the displaced metal ahead of the punch and freeing any excess of said metal for substantially free flow laterally from in front of the punch to fill out said portion.

16. The method of forming socketed articles which consists in, forming a portion to be socketed curved on its outer end and of minimum diameter below the bottom of a socket to be formed therein, and punching a socket through the curved end of said portion while forcing sufficient displaced metal laterally relative to and ahead of the punch to fill out said portion to be socketed to uniform diameter.

17. The method of forming socketed screws which consists in, forming a portion to be socketed of greater diameter at one end than the other and relieved to permit substantially free lateral flow of excess displaced metal throughout the socketing operation to fill out said portion laterally, and punching a turning socket in the larger end of said portion while said portion is supported only at its bottom and while forcing the displaced metal ahead of the punch and freeing any excess of said metal for substantially free flow laterally to fill out said portion.

18. The method of forming socketed screws which consists in, cold forming a portion to be socketed relieved to permit substantially free lateral flow of excess displaced metal throughout a punching operation to fill out said portion laterally to substantially uniform diameter during punching, and cold punching a socket in said portion while forcing the unheated metal displaced by the punch ahead of the punch and freeing any excess of said metal for substantially free lateral flow to fill out said portion to substantially uniform diameter.

19. The method of forming socketed screws which consists in, cold forming a portion to be socketed relieved externally to permit substantially free lateral flow of excess displaced metal throughout the socketing operation to fill out said portion laterally during socketing to substantially uniform diameter throughout its length, and cold punching therein a turning socket of substantially uniform diameter substantially throughout the length of said socket, while forcing the unheated metal displaced by the punch ahead of the punch and freeing any excess of said metal for substantially free lateral flow to fill out said portion to substantially uniform diameter throughout its length and to a point below the bottom of said socket.

20. The method of forming socketed articles which consists in, forming a headed blank having a head portion relieved to permit substantially free lateral flow of excess displaced metal to fill out said head laterally during punching, and punching a finished socket in said head portion while the displaced metal is forced ahead of the punch and freeing any excess of said metal for substantially free lateral flow from in front of the punch to fill out said head.

21. The method of forming socketed screws which consists in, upsetting a blank to form a portion to be socketed relieved to permit substantially free lateral flow of excess displaced metal during socketing and of minimum diameter below the bottom of the socket to be formed therein, and punching a socket of substantially uniform diameter substantially throughout its useful length in said portion while forcing displaced metal ahead of the punch and while maintaining any excess of said metal free for lateral flow out of the punch path to fill out said portion to be socketed laterally as the punch progressively enters the same.

22. The method of forming socketed screws which consists in, upsetting a blank to form a portion to be socketed relieved to permit substantially free flow of excess displaced metal throughout the socketing operation while partially finishing one end of said portion, and punching a socket in said portion while forcing the displaced metal ahead of the punch and while maintaining any excess of said metal free for lateral flow out of the punch path to finish the remainder of said portion.

23. The method of forming socketed articles which consists in, upsetting a blank to form a head while relieving said head to permit substantially free lateral flow of excess displaced metal throughout the socketing operation and crowning the top of said head, and punching a socket through said crowned top while forcing the displaced metal in the head ahead of the punch and maintaining any excess of said metal free for substantially free lateral flow to finish the remainder of the head to substantially uniform diameter throughout its length and to a point below said socket.

24. The method of forming socketed articles which consists in, forming a blank having a portion to be socketed adapted to be filled out during socketing, annealing the blank, and punching the socket in the same while the metal in the latter is forced in front of the punch and free to flow with a lateral component in its flow to fill out the blank.

25. The method of forming socketed articles which consists in, forming a headed blank having a head adapted to be filled out during socketing, annealing the blank, and punching a socket in the head thereof while the metal in the head is free to flow with a lateral component in its flow and forced in front of the punch to fill out said head.

26. The method of forming socketed articles which consists in, upsetting a blank of uniform diameter to form a shallow-socketed head thereon adapted to be filled out laterally during socketing, annealing the headed blank, and punching a deeper socket of increased cross section in said head while the metal in the head is forced in front of the punch and free to flow with a lateral component in its flow to fill out said head.

27. The method of forming socketed articles which consists in, forming a blank adapted to be filled out laterally at the bottom of the portion to be socketed during socketing and also having an initial shallow punching in the top thereof, annealing said blank, and punching a deeper socket of substantially uniform cross section while the metal is free to flow with a lateral component in its flow to fill out the blank.

28. The method of forming socketed screws which consists in, punching a portion to be socketed to form a partially punched socket therein while expanding said portion laterally around said partially punched socket, and further punching said partially punched socket to form a finished turning socket while metal displaced by the punch is free to flow laterally from the finished socket to finish the exterior of said portion below the inner end of said socket as the socket is deepened.

29. The method of forming socketed screws which consists in, punching a portion to be socketed to form a partially punched socket therein while expanding said portion laterally around said partially punched socket and partially finishing the exterior of said portion, and further punching said partially punched socket to form a finished turning socket while metal displaced by the punch is free to flow laterally from the finished socket to further finish the exterior of said portion below and surrounding the full depth of said socket as the socket is deepened.

30. The method of forming socketed fillister screws which consists in, forming a blank having an enlarged head portion to be socketed and a shank and a partially punched socket in said head portion, and further punching said partially punched socket to form a finished turning socket while metal displaced by the punch is free to flow laterally from the finished socket as the latter is deepened and so directed as to finish the exterior of said head portion from below said socket upward around the inner end of the latter.

31. The method of forming hollow set screws which consists in, punching a socket in a blank while the metal in the punched portion of the latter is forced in front of the punch and free to flow with a lateral component in its flow to enlarge the blank laterally, finishing the blank to uniform diameter, and threading the same.

32. The method of cold forming hollow set screws which consists in, forming a headed blank, initially shallow punching the head, punching a deeper socket in the head while the displaced metal is forced in advance of the punch and also free to flow laterally, removing a portion of the head to produce a blank of uniform diameter, and threading the blank.

33. The method of cold forming hollow set screws which consists in, upsetting a blank of uniform diameter to form a head thereon while partially punching the upper end of the head, punching a socket of substantially uniform cross section in the head while the metal in the latter is forced in front of the punch and free to flow with a lateral component in its flow, removing a portion of the head to produce a blank of uniform diameter, and threading the same.

34. The method of making socketed fillister screws which consists in, upsetting a blank to form an externally relieved head on one end thereof having a portion of progressively decreasing diameter on said head extending below the bottom of the socket to be formed therein, and punching a socket of substantially uniform diameter in said head while the metal displaced by the punch is maintained free to flow laterally from in advance of the punch to fill out said portion of progressively decreasing diameter.

35. The method of making socketed fillister screws which consists in, upsetting a blank to form an externally relieved head on one end thereof having a tapered exterior portion on said head extending below the bottom of the socket to be formed therein, and punching a socket of substantially uniform diameter in said head while said head is disposed in a die aperture of substantially uniform diameter of substantially the maximum diameter of said tapered portion and while the metal displaced by the punch is maintained free to flow laterally from in advance of the punch to fill out said tapered portion and head to the diameter of said die aperture.

36. Apparatus for making socketed screws comprising means for upsetting a blank to form an externally relieved head on one end thereof having a portion of progressively decreasing diameter from the maximum diameter of the head and extending below the bottom of the socket to be formed therein, and mechanism for punching a socket of substantially uniform diameter in said head including a punch of substantially uniform diameter substantially throughout its length and a die aperture of substantially uniform diameter and substantially the maximum diameter of said head in which said portion of decreasing diameter is disposed, said punch and die aperture being so proportioned relative to said head that the metal displaced by the punch is maintained free to flow laterally from in advance of the punch to fill out said portion of decreasing diameter to the diameter of said die aperture.

37. Apparatus for forming socketed articles comprising means for forming an article to be socketed having a relieved portion adapted to be filled out laterally during socketing and of minimum diameter below the bottom of the socket to be formed therein, a punch adapted to force the metal in advance of the same to socket said portion, and a die having an aperture in which socketing is performed of greater cross section than said punch and the portion of said article to be punched received in said aperture, said aperture being of such greater cross section as, while said punch progressively enters said portion, to permit substantially free lateral flow of the displaced metal in said punched portion out of the path of the punch and complete lateral filling out of said portion by said displaced metal to the diameter of said aperture.

38. Apparatus for forming socketed articles comprising means for forming an article to be socketed having a relieved portion adapted to be filled out laterally during socketing and of minimum diameter below the bottom of the socket to be formed therein, a socketing punch adapted to force the displaced metal to fill out said portion of minimum diameter, and a die having an aperture in which socketing is performed and which is of greater cross section than said punch and the portion of said article to be punched received in said aperture and in which said portion is supported only at the bottom of said aperture prior to punching, said aperture being of such cross section greater than said portion and punch as to permit substantially free lateral flow of displaced metal as the punch enters said relieved portion and lateral filling out of said portion by said displaced metal to uniform diameter to a point below the socket bottom during the punching operation.

39. Apparatus for forming socketed articles comprising means for forming a blank to be socketed having a relieved external portion of minimum diameter below the bottom of the socket to be formed therein, a punch adapted to force the metal in advance of the same to socket said portion, and a die having a socket forming aperture of substantially the maximum diameter of said relieved portion and of greater cross section than said punch and the portion of maximum diameter of the article to be punched which is received in said die, said aperture being of such cross section as, while permitting free lateral flow of the metal displaced by said punch and lateral filling out of said portion by said displaced metal to conform to said aperture, to substantially inhibit elongation of said portion during the punching operation.

40. Apparatus for forming socketed articles comprising means for forming a blank to be socketed having a relieved external portion of minimum diameter below the bottom of the socket to be formed therein, a punch of substantially uniform cross section adapted to force the metal to fill out said portion of minimum diameter, and a die having a socket forming aperture having side walls forming a continuous unbroken surface and of greater cross section than said punch and the portion of the article to be punched which is received in said die, said aperture being of such cross section as, while permitting free lateral flow of the metal displaced by said punch and lateral filling out of said portion by said displaced metal to conform to said aperture, to substantially inhibit elongation of said portion during the punching operation.

41. Apparatus for forming socketed articles comprising means for forming a blank having a relieved portion adapted to be filled out laterally at its bottom during socketing and of minimum diameter below the bottom of the socket to be formed therein, and means for punching said blank to form a socket therein comprising a punch adapted to force displaced metal in front of the same to fill out said portion and a die having a socket forming aperture of substantially uniform diameter substantially throughout the length of said aperture receiving the relieved portion of the blank and of such greater cross section than said relieved portion and punch as to permit substantially free lateral flow of the displaced metal during the punching operation to fill out said portion and die laterally as the punch progressively forms the socket.

42. Apparatus for forming socketed articles comprising means for forming a portion to be socketed having a relieved external portion which is of the maximum diameter of said portion to be socketed and also is of minimum diameter adjacent the inner end of the socket to be formed therein and adapted to be filled out laterally during socketing throughout the whole length of said portion to be socketed, and means for socketing said portion comprising a punch adapted to fill out said portion laterally as it engages and sockets said portion and a die having an aperture of substantially uniform cross section larger than said punch and of substantially the same diameter as the maximum diameter of said relieved portion receiving said portion while supporting the latter only at its inner end and permitting substantially free lateral flow of the excess displaced metal throughout the punching operation to fill out said punched portion laterally to fill said die.

43. Apparatus for forming hollow screws comprising means for forming a headed blank having a relieved head portion thereon adapted to permit free lateral flow of displaced metal throughout the socketing operation, and means for punching said portion to form a socket therein comprising a punch, and a die supporting the relieved portion of the head therein while permitting substantially free lateral flow of the metal displaced by the punch during the punching operation, said punch being of substantially uniform cross section and said die having an oversized aperture of substantially uniform cross section therein extending from the top surface of said die below the bottom of the socket to be formed in said head portion and receiving the end of said head portion and adapted to be filled out during the punching operation by said displaced metal.

44. Apparatus for forming hollow screws comprising means for upsetting a blank to form a portion to be socketed relieved to permit free lateral flow of displaced metal throughout the socketing operation and of minimum diameter below the bottom of the socket to be formed therein, and means for punching said portion while permitting substantially free lateral flow of the metal displaced by the punch during the punching operation, comprising a punch of substantially uniform cross section and a die having therein an aperture of substantially uniform cross section and of substantially the maximum cross section of said portion to be socketed and extending below the bottom of the socket to be formed in said portion to be socketed and receiving the end of said portion and adapted to be filled out during the punching operation by said displaced metal.

45. Apparatus for forming hollow screws comprising means for forming a headed blank having a relieved portion adapted to permit free lateral flow of displaced metal throughout the socketing operation, and means for punching one end of said portion to form a socket therein and comprising a punch, and a die supporting the relieved portion of the blank while permitting substantially free lateral flow of said metal displaced by the punch during the punching operation, said punch being of substantially uniform cross section and said die having an oversized aperture therein of substantially uniform cross section greater than the cross section of said punch and of said blank, enclosing substantially the whole head of the blank, while extending from the top of said die substantially below the bottom of said socket and adapted to be filled out during the punching operation to fill out said head to substantially uniform diameter from the top thereof below the bottom of said socket.

46. Apparatus for forming socketed screws comprising upsetting means for forming a portion to be socketed having a relieved external portion which is of minimum diameter below the inner end of the socket to be formed therein and adapted to be filled out laterally during socketing and of maximum diameter nearer the outer end of the socket to be formed therein, and means for socketing through the larger end of said portion to be socketed comprising a punch of substantially uniform cross section substantially throughout the useful portion of said punch adapted to fill out said relieved portion laterally as it engages and sockets said portion to be socketed, and a die having an aperture of substantially uniform cross section and of substantially the maximum diameter of said relieved portion and receiving said portion while permitting substantially free lateral flow of the displaced metal during the punching operation, to fill out said relieved portion and die.

47. Apparatus for forming socketed articles comprising upsetting means for forming a portion to be socketed having a relieved external portion which is of minimum diameter adjacent the inner end of the socket to be formed therein and adapted to be filled out laterally during socketing and of maximum diameter nearer the outer end of the socket to be formed therein, and means for socketing through the larger end of said portion to be socketed comprising a punch adapted to fill out said relieved portion laterally as it engages and sockets said portion to be socketed and a die having an aperture of substantially uniform cross section and substantially of the maximum diameter of said relieved portion and receiving said portion while permitting substantially free lateral flow of the displaced metal during the punching operation to fill out said relieved portion, said punch and die being so proportioned relative to one another and said relieved portion as substantially to eliminate elongation of said portion to be socketed during socketing while said lateral flow of metal fills said die.

48. Apparatus for forming hollow screws comprising means for forming a portion to be socketed externally relieved to permit free lateral flow of displaced metal during socketing and having the maximum diameter of the relief the maximum diameter of said portion, means for punching said portion to be socketed comprising a punch adapted to force sufficient displaced metal laterally to fill out said portion progressively inward as said punch enters said portion and to fill out said relief to a point below the bottom of the socket, and a die supporting said portion only at its bottom prior to punching and of such cross section as to permit free lateral flow of displaced metal as said punch engages and sockets said portion while progressively finishing said portion and socket as said punch moves into said portion.

49. Apparatus for forming hollow screws comprising means for forming a portion to be socketed externally relieved to permit free lateral flow of displaced metal during socketing and having the maximum diameter of the relief the maximum diameter of said portion, means for punching said portion to be socketed comprising a punch adapted to force sufficient displaced metal laterally to fill out said portion progressively inward as said punch enters said portion and to fill out said relief to a point below the bottom of the socket, said punch throughout the socketing operation remaining out of contact with the area of the socketed end of the portion to be socketed which surrounds the socket, and a die supporting said portion only at its bottom prior to punching and of such cross section as to permit free lateral flow of displaced metal as said punch engages and sockets said portion while progressively finishing said portion and socket as said punch moves into said portion.

50. Apparatus for forming hollow screws comprising means for forming a portion to be socketed having a curved top and externally relieved below the same to permit free lateral flow of displaced metal during socketing and having the maximum diameter of the relief the maximum diameter of said portion, means for punching said portion to be socketed comprising a punch adapted to force sufficient displaced metal laterally to fill out said portion progressively inward as said punch enters said portion and to fill out said relief to a point below the bottom of the socket, said punch throughout the socketing operation remaining out of contact with the curved area of the socketed end of the portion to be socketed which surrounds the socket, and a die supporting said portion only at its bottom prior to punching and of such cross section as to permit free lateral flow of displaced metal as said punch engages and sockets said portion while progressively finishing said portion and socket as said punch moves into said portion.

51. Apparatus for forming socketed articles comprising means for forming a shank and a head portion thereon to be socketed adapted to be filled out laterally during socketing throughout the whole length of said portion to be socketed, and means for socketing said last mentioned portion comprising a punch adapted to fill out said portion laterally as the punch engages and sockets said portion and a die having an aperture coaxial with said punch receiving said shank and extending to the outermost face of said die and having a flat outermost face forming a support for the bottom of said head while permitting substantially free lateral flow of the displaced metal throughout the punching operation to fill out said punched portion laterally.

52. Apparatus for forming hollow screws comprising means for forming a headed blank having a shank and a head portion thereon to be socketed adapted to permit free lateral flow of displaced metal throughout the socketing operation, and means for punching said head portion to form a socket therein comprising a punch and a die having an aperture coaxial with said punch receiving said shank and having an enlarged communicating coaxial aperture receiving the inner end of said head portion while permitting substantially free lateral flow of metal displaced by the punch during the punching operation, said punch being of substantially uniform cross section and said last mentioned aperture being of substantially uniform cross section and of substantially less depth than said head portion and adapted to be filled out laterally during the punching operation while the protruding portion of said head is filled out wholly outside said aperture.

53. In an apparatus for forming hollow screws, means for forming a portion to be socketed having a relief of the maximum diameter of said portion and of a minimum diameter at a point adjacent the bottom of the socket to be formed therein, and mechanism for socketing said portion comprising a punch forcing sufficient displaced metal to fill out said portion as the punch progressively enters the same, and means for supporting said portion only at its inner end during punching comprising a die having an aperture receiving said portion and having said aperture throughout its length of substantially the maximum cross section of said portion prior to punching and adapted to be filled out thereby during punching, and also having a further aperture opening below said first mentioned aperture and forming an inward continuation thereof, and a knock out pin in said last mentioned aperture forming a support for said portion during punching.

54. In an apparatus for forming hollow screws, upsetting means for forming a portion to be socketed having a relief of the maximum diameter of said portion and of minimum diameter at a point below the bottom of the socket to be formed therein, and mechanism for socketing said portion comprising a punch of substantially uniform cross section forcing sufficient displaced metal to fill out said portion as the punch progressively enters the same, and means for supporting said portion only at its inner end during punching comprising a die having an aperture receiving said portion and having said aperture throughout its length of substantially the maximum cross section of said portion prior to punching and adapted to be filled out thereby during punching and also having a further aperture opening below said first mentioned aperture, and a knock out pin in said last mentioned aperture forming a support for said portion during punching.

55. In an apparatus for forming hollow screws, means for forming a portion to be socketed having a relief of the maximum diameter of said portion and of a minimum diameter at a point adjacent the bottom of the socket to be formed therein and also having a shank of reduced diameter below said portion, and mechanism for socketing said portion comprising a punch forcing sufficient displaced metal to fill out said portion as the punch progressively enters the same, and means for supporting said portion only at its inner end during punching comprising a die having an aperture receiving said portion and having said aperture throughout its length of substantially the maximum cross section of said portion prior to punching and adapted to be filled out thereby during punching and also having a further aperture opening below said first mentioned aperture and forming an inward continuation thereof, and a knock out pin in said last mentioned aperture forming a support for said portion during punching, said second mentioned aperture being of smaller diameter than said first mentioned aperture and said portion to be socketed having its shank of reduced diameter below the same disposed in said second mentioned aperture.

56. A socketed turning member having an open punched socket in one end thereof for interlocking with a cooperating turning member, said socket being of substantially uniform cross section and said member having continuous compacted fibres extending laterally around the bottom of said socket and forming the sides of the latter.

57. A socketed turning member having a punched socket in one end thereof having means for interlocking with a co-operating turning member, said socket being of substantially uniform cross section and said member having continuous substantially unstretched fibres extending laterally around the bottom of said socket and forming the sides of the latter.

58. A socketed screw having an open punched socket in one end thereof, said socket being of substantially uniform cross section and said screw having axially compacted core fibres forming the socket bottom and continuous compacted outer fibres extending laterally from a point beneath said compacted core fibres around the bottom of said socket and forming the sides of the latter.

59. A socketed turning member of high carbon alloy steel having an open punched socket in one end thereof for interlocking with a cooperating turning member, and also having compacted fibres forming the bottom of said socket and compacted fibres also extending laterally around the bottom of said socket and forming the sides of the latter.

60. A socketed turning member of high carbon alloy steel having an open punched socket in one end thereof for interlocking with a cooperating turning member, said socket being of substantially uniform cross section and said member having compacted fibres in the bottom of said socket and also substantially unstretched fibres extending laterally around said compacted fibres in the bottom of said socket and forming the sides of the latter.

61. A socketed fillister screw having an open punched socket in one end thereof having means for interlocking with a cooperating turning member, said socket being of substantially uniform cross section substantially throughout its length and said member having the metal displaced by the punching of said socket compacted in the bottom of the socket and also around the latter and so disposed that each compacted area strengthens the socket walls.

62. A socketed fastening member having an open punched socket in one end for interlocking with a cooperating turning member, a compacted portion forming the bottom of said socket, and continuous fibres extending from an adjacent portion of said member outwardly around said compacted portion and forming the sides of the socket.

63. A socketed fastening member having an open punched socket in one end thereof for interlocking with a cooperating turning member, compacted core fibres forming the bottom of said socket, and continuous outer fibres extending from an adjacent portion of the member and along the socket having compacted portions extending outwardly around said compacted core fibres and the bottom of said socket and terminating in the side walls of said socket.

64. A socketed fastening member having an open punched socket in one end for interlocking with a cooperating turning member, a compacted portion forming the bottom of said socket, and continuous fibres extending longitudinally of an adjacent portion of said member and outwardly around said compacted portion and forming the sides of the socket, said member having a head in which the socket is formed and said continuous fibres passing outward laterally between the bottom of the socket and the bottom of said head.

65. A socketed fastening member having an open punched socket for interlocking with a cooperating turning member, said socket being of substantially uniform cross section substantially throughout the length of said socket, and fibres extending from an adjacent portion of said member into the socketed portion thereof having portions of substantially the same fibrous character as in said adjacent portion and extending outward and around the socket bottom and inward above the socket bottom into the walls of the socket.

66. A socketed torsion resisting member having an open punched socket in one end and fibres extending from an adjacent portion of said member below said socket into the socketed portion thereof and having axially compressed portions forming the socket bottom and laterally deflected below the latter and also portions of substantially the normal fibrous structure and at least the normal strength of fibres in said adjacent portion extending from the latter outward and around said laterally deflected portions and forming the walls of said socket.

67. A socketed torsion resisting member of steel having an open cold punched socket in one end, vertically compressed core fibres laterally deflected beneath the socket bottom and having upper compressed portions forming the bottom of said socket, and also uncut, continuous, substantially unstretched fibres of at least equal strength to and of substantially the same fibrous structure as the fibres in an adjacent portion of said member below said laterally deflected fibres, and extending from said portion around said laterally deflected fibres below the socket bottom and forming the walls of said socket.

68. A screw having a socket in one end for interlocking with a cooperating turning member, a compacted portion forming the bottom of said socket, and continuous fibres extending from an adjacent portion of said screw outwardly around said compacted portion and along the sides of the socket, said fibres at the sides of said socket having portions disposed substantially transversely of the socket and terminating in its walls.

69. A fillister screw having a head and a shank and a socket in said head for interlocking with a cooperating turning member, said socket being of substantially uniform cross section and also having continuous fibres extending from the shank into the bottom of said head and around the bottom of said socket.

70. A fillister screw having a head provided with a socket for interlocking with a cooperating turning member, and continuous fibres extending from the shank into the bottom of said head and around the bottom of said socket, said fibres being compacted axially of the socket and in the zone surrounding the bottom of the latter.

71. A socketed turning member having in one end thereof a true and complete socket of substantially uniform diameter for interlocking with a cooperating turning member, and having socket walls comprising compacted continuous and substantially unstretched fibres extending from said walls around the bottom of said socket toward the opposite end of said member.

72. A socketed turning member having in one end thereof a true and complete punched socket of substantially uniform diameter for interlocking with a cooperating turning member, and having socket walls comprising compacted continuous and substantially unstretched fibres extending from said walls around the bottom of said socket toward the opposite end of said member.

73. A socketed turning member of high carbon alloy steel, and having in one end thereof a punched socket of substantially uniform diameter for interlocking with a cooperating turning member, and also having socket walls comprising compacted continuous and substantially unstretched fibres, and said fibres extending from said walls around the bottom of said socket toward the opposite end of said member.

74. A socketed turning member having in one end thereof a true and complete punched socket of substantially uniform diameter for interlocking with a cooperating turning member, and having socket walls comprising compacted continuous and substantially unstretched fibres extending from said walls around the bottom of said socket toward the opposite end of said member and axially compressed laterally deflected core fibres beneath the bottom of said socket.

75. A socketed turning member having in one end thereof a punched socket of substantially uniform diameter for interlocking with a cooperating turning member, and also having socket walls comprising compacted continuous and substantially unstretched fibres extending from said walls around the bottom of said socket toward the opposite end of said member, and also axially compressed laterally deflected core fibres disposed beneath the bottom of said socket, said first mentioned fibres forming an enclosing sheath for said core fibres.

76. A socketed turning member having a head and in one end thereof a true and complete punched socket of substantially uniform diameter for interlocking with a cooperating turning member, and having socket walls in said head comprising compacted continuous and substantially unstretched fibres extending from said walls around the bottom of said socket and between the same and the bottom of said head toward the opposite end of said member and axially compressed laterally deflected core fibres beneath the bottom of said socket and forming the bottom of the latter.

77. A socketed turning member having a head on one end thereof and in one end of said head a punched socket of substantially uniform diameter for interlocking with a cooperating turning member, and also having socket walls comprising compacted continuous and substantially unstretched fibres extending from said walls between the bottoms of said socket and of said head toward the opposite end of said member, and also axially compressed laterally deflected core fibres beneath the bottom of said socket, said first mentioned fibres forming an enclosing sheath for said core fibres and being compacted beneath the peripheral portion of the socket bottom and above the bottom of said head and said core fibres being compacted to form the bottom of the socket.

78. A socketed member having an open punched socket in one end and means formed in said socket walls for interlocking with a cooperating turning member, axially compressed core fibres having laterally deflected portions beneath the socket bottom and having upper portions forming the bottom of said socket, and continuous outer socket wall fibres having portions extending from an adjacent portion of said member below said socket and outward around said laterally deflected portions below the socket bottom and forming the walls of said socket above said bottom.

79. A socketed screw of high carbon alloy steel having a body and a socketed portion at one end thereof provided with an open punched socket of substantially uniform polygonal cross-section for interlocking with a cooperating turning member, and fibres extending from an adjacent portion of said body into said socketed portion comprising axially compressed core fibres laterally deflected into substantially flanged core form below said socket bottom and having upper compressed portions forming the bottom surface of said socket, and outer continuous fibres extending from said adjacent portion around said laterally deflected core fibres below the socket bottom and forming the sides of said socket.

80. A socketed fillister screw of high carbon alloy steel having a shank and a head thereon provided with an open punched socket of substantially uniform polygonal cross-section for interlocking with a cooperating turning member, and fibres extending from an adjacent portion of said shank into the bottom of said head comprising axially compressed core fibres laterally deflected in substantially flanged core form below the socket bottom and having upper compressed portions forming the bottom surface of said socket, and outer continuous fibres of at least equal strength to and of substantially the same fibrous structure as the fibres in said adjacent portion of said shank and extending from said portion laterally around said laterally deflected core fibres between the bottom of said socket and of said head and along the walls of said socket and then reversely laterally into said walls.

WILLIAM A. PURTELL.